Figure 1:
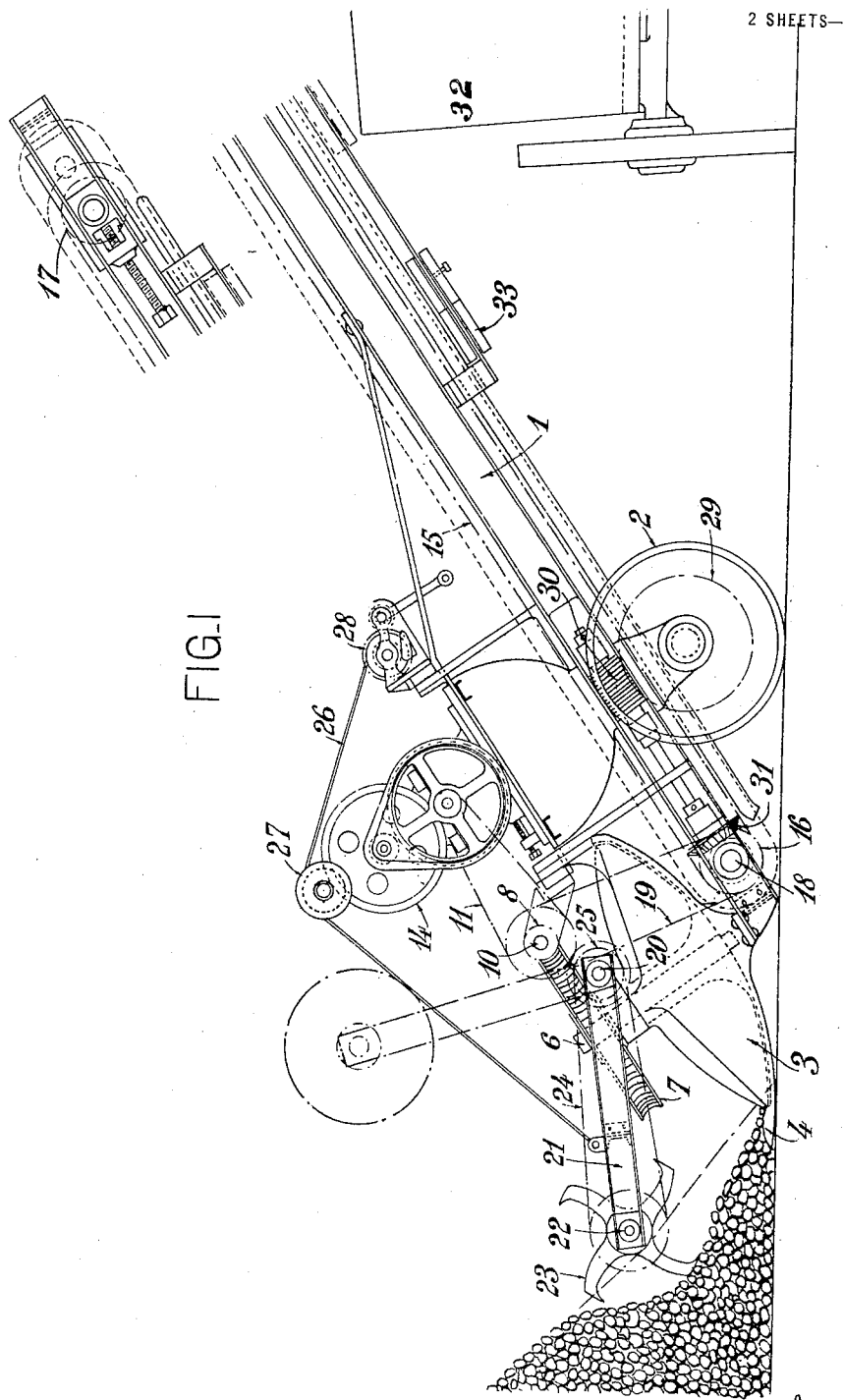

A. GRANDJEAN.
PORTABLE LOADING APPARATUS.
APPLICATION FILED AUG. 24, 1918.

1,393,214.

Patented Oct. 11, 1921.
2 SHEETS—SHEET 1.

Inventor
Adolphe Grandjean
by Ottomunn
his Attorney

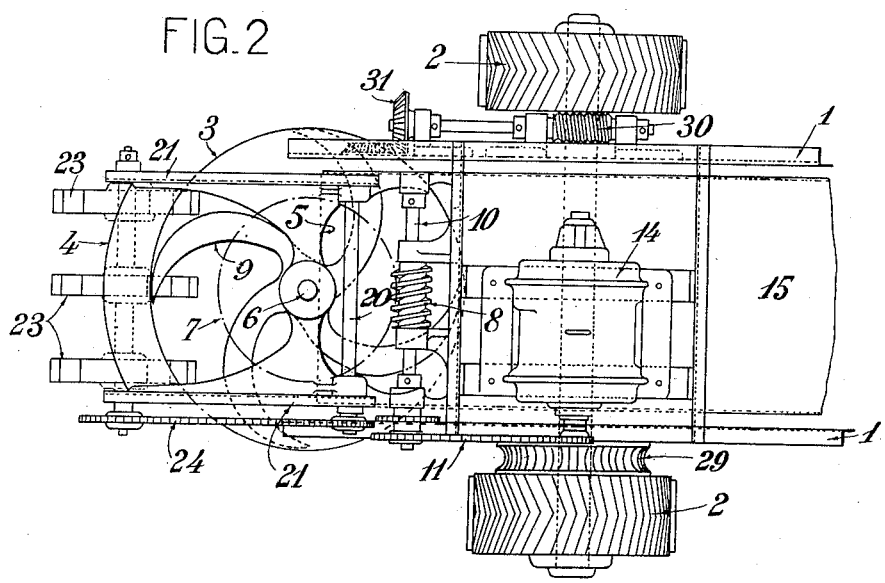

UNITED STATES PATENT OFFICE.

ADOLPHE GRANDJEAN, OF PARIS, FRANCE.

PORTABLE LOADING APPARATUS.

1,393,214.   Specification of Letters Patent.   Patented Oct. 11, 1921.

Application filed August 24, 1918. Serial No. 251,317.

(GRANTED UNDER THE PROVISIONS OF THE ACT OF MARCH 3, 1921, 41 STAT. L., 1313.)

*To all whom it may concern:*

Be it known that I, ADOLPHE GRANDJEAN, citizen of the Republic of France, residing at 235 Rue La Fayette, Paris, in the Republic of France, have invented new and useful Improvements in Portable Loading Apparatus, (for which I have filed applications in Belgium Dec. 22, 1913, Patent No. 263,165, and in Germany April 16, 1914, Patent No. 323,460, and in France June 4, 1914, Patent No. 474,394, and in Great Britain April 20, 1917, Patent No. 105,767,) of which the following is a specification.

This invention has for its object to provide an improved apparatus for loading from bulk in a continuous and automatic manner, all kinds of loose materials, in powder or in more or less small pieces, such as sand, pebbles, ore, coal, etc., for the purpose of loading same into trucks, wagons, carts and other transporting devices.

The improved apparatus is characterized chiefly by the feature that it comprises a gathering device consisting of a fixed basin which during the loading occupies an inclined position and penetrates with its lower edge into the materials to be loaded. In this basin there is adapted to revolve a rotary shovel which is power-driven and consists of a number of radial blades integral with each other. This rotary shovel is arranged to engage the materials to be loaded which fall by gravity into the lower part of the basin, and to lift the said materials to the upper part of said basin. The basin is pierced with an aperture at this place in such a manner that the lifted materials can drop on to a conveyer of any type. This gathering device is mounted, together with the conveyer, on a frame fitted with wheels. On the said frame there is also mounted preferably a picking device designed to cause the materials to slide down into the basin, this picking device comprising an arm of variable inclination, carrying at its outer end rotary claws or hooks.

The accompanying drawings illustrate by way of example a constructional form of this invention.

In these drawings:

Figure 1 is a side elevation of the improved loading apparatus in its operative position, and Fig. 2 is a partial plan of the same, showing some of the parts, diagrammatically.

As shown, the improved apparatus comprises a frame 1 mounted on two wheels 2 having a firm grip of the ground. On the rear end of this frame there is fixed a metal basin 3 which may have approximately the shape shown. This basin is provided at its rear with a projecting edge 4 forming a sort of beak, and it is pierced in front with an aperture 5. A shaft 6 extends axially through the basin and carries a helical wheel 7 driven by a worm 8. On the shaft 6 there is fixed a sort of rotary shovel composed of curved arms or blades 9 which are arranged radially, and whose lower edges fit the innner contour of the basin. The worm 8 is mounted on a horizontal cross shaft 10 which is driven by means of a chain 11 and two speed-reducing pinions, by an electric motor 14 mounted in an elevated position on the frame.

On the frame there is also mounted a conveyer 15 having an endless metal band; instead of this conveyer there may be employed a conveyer composed of blades working in a fixed trough, or a chain of buckets may be employed. This band is supported at its ends on wheels 16, 17 in the usual manner. It may be stretched by the usual means. The wheels 16 are mounted on a shaft 18 driven from the electric motor 14 by means of a chain 19. The rear end of the band passes underneath the aperture 5 provided in the basin 3 in such a manner as to receive the materials that fall through the said opening.

The upper part of the basin 3 carries in two bosses, a fixed cross shaft 20 on the ends of which are pivoted two parallel arms 21 whose free ends are connected by a shaft 22 on which are fixed for instance three picking devices 23 consisting of rotary hooks or claws. The shaft 22 is rotated by means of a chain 24 driven by a pinion 25 turning on the shaft 20, this pinion being driven through gearing from the shaft 10. The arms 21 may be raised to any desired inclination by means of a rope 26 which passes over a guide pulley 27 and is wound on a hand windlass 28.

The frame 1 may be moved about by any desired means, for instance by hand or animal power. Moreover, it is provided with gearing which enables it to be advanced progressively toward the heap of the materials by the action of the electric motor 14, at the rate of progress of the work. For this purpose there may be coupled to each of the wheels 2 by means of a clutch not shown, a helical wheel 29, that can be driven by a worm 30. The two worms 30 are driven from the electric motor, for instance by means of bevel pinions 31 driven by the shaft 18. Thus, by engaging one or the other of the wheels, or both, the frame can be caused to penetrate obliquely or longitudinally into the heap of materials.

32 indicates a truck or wagon into which the materials are loaded.

33 is a counterweight adapted to slide longitudinally on the frame for the purpose of reëstablishing the equilibrium of the apparatus and thus facilitating its transport from one place to another.

During its operation, the apparatus occupies the inclined position shown in Fig. 1, and the basin 3 which assumes also an inclined position, enters with its lower edge or with its beak 4 that is provided at that point, into the base of the heap of materials. This penetrating movement can be regulated by engaging the wheels 2 with the electric motor. Owing to the rotation of the blades 9, the materials that fall into the basin are raised to the upper part of the latter and drop through the aperture 5 onto the conveyer 15 which discharges them into the vehicle 32 to be loaded. The picking devices 23 whose position is regulated by means of the windlass 28, attack the base of the heap and cause the materials to slide down into the basin and thus facilitate the progressive advance of the apparatus into the heap of materials without great effort.

The improved apparatus is of simple construction as shown; it is comparatively light, not bulky, and easy to handle.

It is to be understood that this invention is not limited to the construction as shown, which is given here solely by way of example. In particular, the actuating gearings may be designed differently from those shown. The motor also need not be an electric motor.

Having now described my invention, what I claim as new and desire to secure by Letters Patent is:

1. A portable apparatus for loading coal, ore and like materials, comprising, in combination: a carriage, an endless conveyer on said carriage, operating means for said conveyer, a circular concave basin mounted on the carriage and extending over the endless conveyer, said concave basin having an aperture arranged over the conveyer, a blade wheel rotatably supported in said concave basin and means for operating said blade wheel.

2. A portable apparatus for loading coal, ore and like materials, comprising in combination: a carriage, an endless conveyer on said carriage, operating means for said conveyer, a circular concave basin mounted on the carriage and extending over the endless conveyer, said concave basin having an aperture arranged over the conveyer, a blade wheel rotatably supported in said concave basin, means for operating said blade wheel and a picking device mounted on the carriage and adapted to cause the materials to slide down into the concave basin.

3. A portable apparatus for loading coal, ore and like materials, comprising in combination: a carriage, an endless conveyer on said carriage, operating means for said conveyer, a circular concave basin mounted on the carriage and extending over the endless conveyer, said concave basin having an aperture arranged over the conveyence blade wheel rotatably supported in said concave basin, means for operating said blade wheel, a pair of arms pivotally mounted on the carriage, a shaft rotatably carried on the said arms at one end thereof, rotary hooks on said shaft, means for rotating said shaft and means for varying the inclination of the arms.

In testimony whereof I have signed my name to this specification in the presence of two subscribing witnesses.

ADOLPHE GRANDJEAN.

Witnesses:
 ANTOINE LAVOIX,
 JOHN F. SIMONS.